(12) United States Patent
Horstman, III

(10) Patent No.: US 11,984,048 B2
(45) Date of Patent: May 14, 2024

(54) SYSTEM FOR INTERACTIVE VISUAL EDUCATION

(71) Applicant: Martin Thomas Horstman, III, White Plains, NY (US)

(72) Inventor: Martin Thomas Horstman, III, White Plains, NY (US)

(*) Notice: Subject to any disclaimer, the term of this patent is extended or adjusted under 35 U.S.C. 154(b) by 644 days.

(21) Appl. No.: 17/024,889

(22) Filed: Sep. 18, 2020

(65) Prior Publication Data
US 2021/0090453 A1    Mar. 25, 2021

Related U.S. Application Data

(60) Provisional application No. 62/903,676, filed on Sep. 20, 2019.

(51) Int. Cl.
| | |
|---|---|
| *G09B 7/02* | (2006.01) |
| *G06F 3/04817* | (2022.01) |
| *G06F 3/0482* | (2013.01) |
| *G09B 7/06* | (2006.01) |

(52) U.S. Cl.
CPC ........... *G09B 7/02* (2013.01); *G06F 3/04817* (2013.01); *G06F 3/0482* (2013.01); *G09B 7/06* (2013.01)

(58) Field of Classification Search
CPC ..... G09F 3/0482; G09F 3/04817; G09B 7/02; G09B 7/06
See application file for complete search history.

(56) References Cited

U.S. PATENT DOCUMENTS

| | | | |
|---|---|---|---|
| 2011/0291972 A1* | 12/2011 | Berry | G06F 3/0488 |
| | | | 345/173 |
| 2017/0075881 A1* | 3/2017 | Lewis | G06F 40/166 |
| 2017/0205990 A1* | 7/2017 | Ma | G06F 3/04817 |
| 2019/0025999 A1* | 1/2019 | Murphy | G06F 3/0482 |
| 2021/0233427 A1* | 7/2021 | Pesta | G09B 5/065 |

* cited by examiner

*Primary Examiner* — James S. McClellan
(74) *Attorney, Agent, or Firm* — OSTROLENK FABER LLP

(57) ABSTRACT

A system for interactive visual education includes: a server configured to educate a user; a network operably connected to the server; an external device usable by the user, the external device further configured to communicate with the server using the network, the external device further configured to receive input from the user, the external device further configured to upload the input to the server via the network; an interactive visual education page viewable by the user using the external device, the interactive visual education page comprising a visual teaching section configured to teach the user a lesson, the interactive visual education page further comprising an interactive tools page, the interactive tools page comprising an interactive tool usable with the external device to interactively support the user in applying the lesson; and storage configured to store data, the storage operably connected to the server over the network.

20 Claims, 9 Drawing Sheets

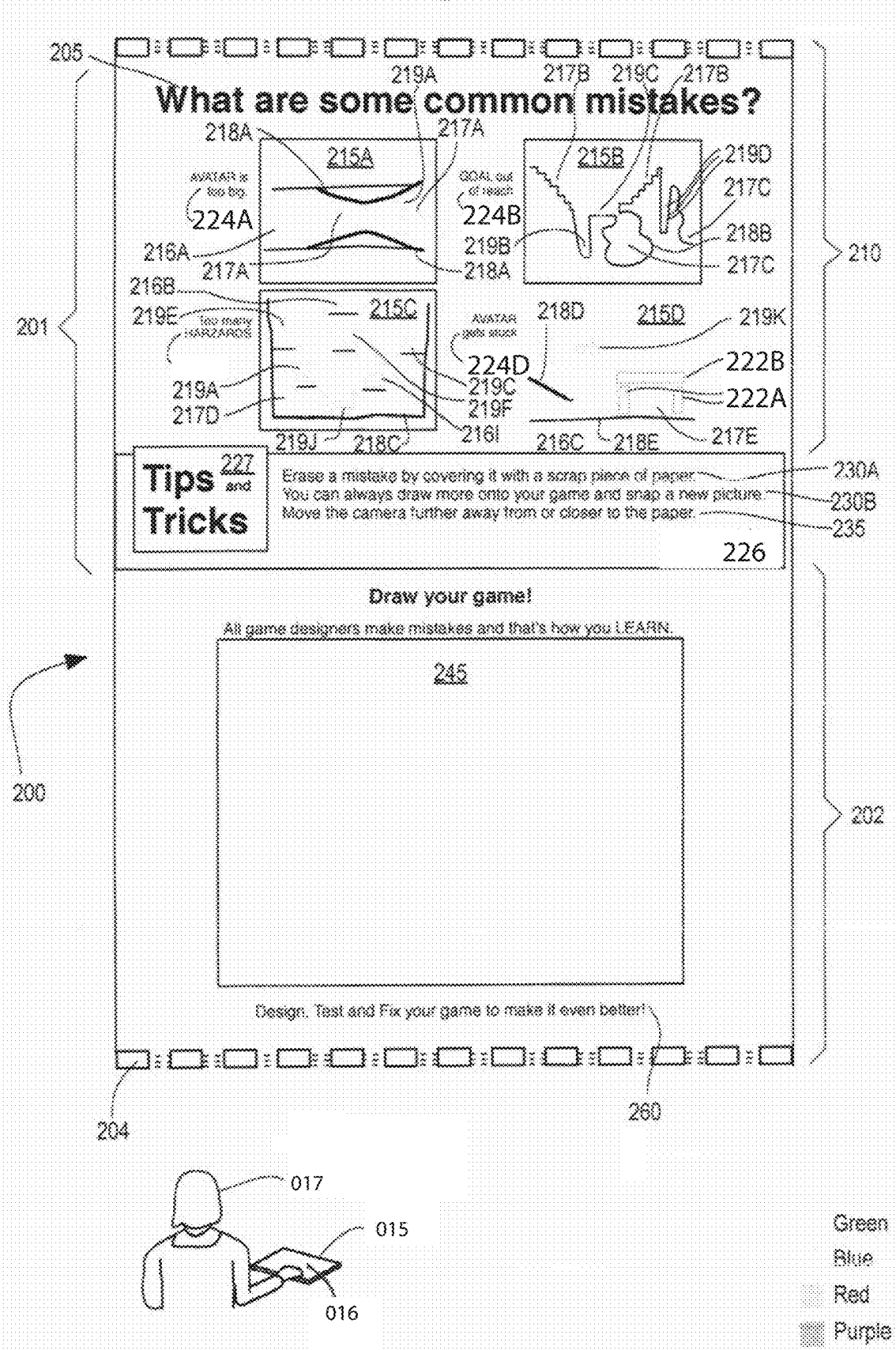

Fig. 5

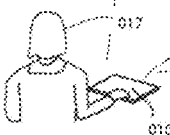

SYSTEM FOR INTERACTIVE VISUAL EDUCATION

CROSS-REFERENCE TO RELATED APPLICATION

The present non-provisional application for utility patent claims priority to U.S. Provisional Patent Application No. 62/903,676, filed Sep. 20, 2019, which has the same inventor as the present application. The contents of this provisional patent application are incorporated in full herein by reference.

SUMMARY

Embodiments of the invention relate in general to a system for interactive visual education. The system for interactive visual education enables a user to create a game, learn a subject, and learn a skill. For example, the subject the user learns comprises one or more of physics, mathematics, engineering, biology, history, economics, accounting, law, medicine, nursing, mythology, game design, a native language, a foreign language, literacy, literary analysis, and another subject. According to an aspect of a method according to the invention, upon completion of a drawing, the user may use the drawing as the input image for a software application that creates a video game using codeless video game creation.

The system for interactive visual education comprises an interactive visual education page configured to interactively educate the user.

A method for providing interactive visual education to a user includes: providing to the user, by a system for providing interactive visual education to the user, the system comprising a server configured to educate the user, the system further comprising a network operably connected to the server, the system further comprising an external device usable by the user, the external device further configured to communicate with the server using the network, the external device further configured to receive input from the user, the external device further configured to upload the input to the server via the network, an interactive visual education page configured to interactively educate the user, the interactive visual education page viewable by the user using the external device, the interactive visual education page comprising a visual teaching section configured to teach the user a lesson, the interactive visual education page further comprising an interactive tools page, the interactive tools page comprising an interactive tool usable with the external device to interactively support the user in applying the lesson; using the external device and the interactive tools page, by the system, displaying to the user the interactive tool; and receiving input from the user, by the system, regarding the interactive tool via the external device over the network.

A system for interactive visual education includes: a server configured to educate a user; a network operably connected to the server; an external device usable by the user, the external device further configured to communicate with the server using the network, the external device further configured to receive input from the user, the external device further configured to upload the input to the server via the network; an interactive visual education page configured to interactively educate the user, the interactive visual education page viewable by the user using the external device, the interactive visual education page comprising a visual teaching section configured to teach the user a lesson, the interactive visual education page further comprising an interactive tools page, the interactive tools page comprising an interactive tool usable with the external device to interactively support the user in applying the lesson; and storage configured to store data, the storage operably connected to the server over the network.

A system for interactive visual education includes: a server configured to educate a user; a network operably connected to the server; an external device usable by the user, the external device further configured to communicate with the server using the network, the external device further configured to receive input from the user, the external device further configured to upload the input to the server via the network; an interactive visual education page configured to interactively educate the user, the interactive visual education page viewable by the user using the external device, the interactive visual education page comprising a top half page, the interactive visual education page further comprising a bottom half page, the top half page comprising a visual teaching section configured to teach the user a lesson, the bottom half page comprising an interactive tools page, the interactive tools page comprising an interactive tool usable with the external device to interactively support the user in applying the lesson; and storage configured to store data, the storage operably connected to the server over the network.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

FIGS. 1A-4 depict four examples of the system for interactive visual education applied to teaching a user game creation skills.

FIG. 5 depicts an example of the system for interactive visual education applied to teaching a user mathematics.

FIG. 8 illustrates the system displaying a teaching box and a box that receives student/user input, in this example, learning the use of the "less than" or "greater than" symbol.

DETAILED DESCRIPTION

Embodiments of the invention relate in general to a method and system for interactive visual education. For example, the system for interactive visual education may comprise printed pages. For example, the printed pages appear in one or more of a book, a workbook, and a notebook. Alternatively, or additionally, the system for interactive visual education comprises pages appearing on a screen of a computer.

Figure 9:
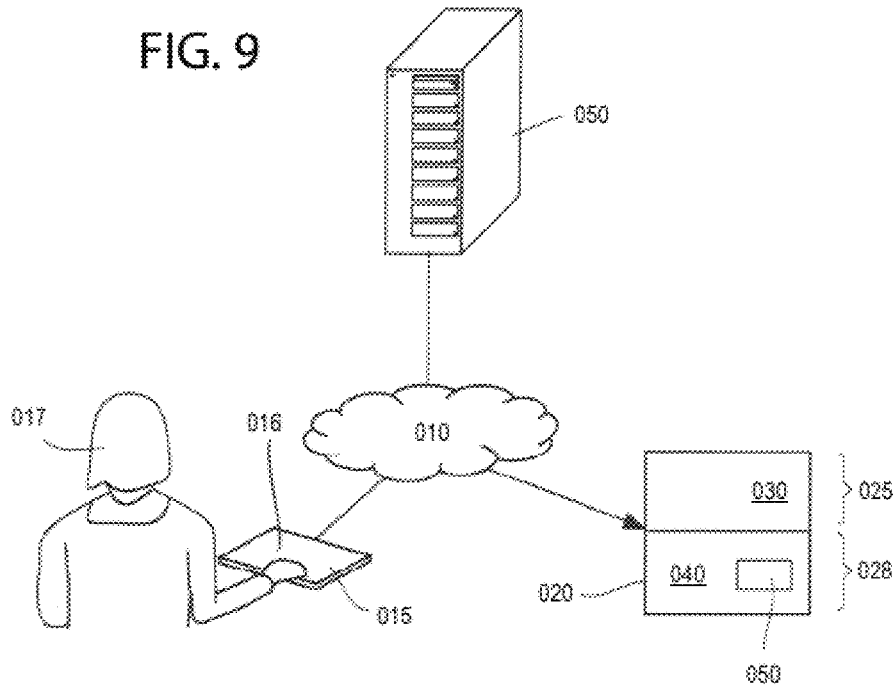

FIG. 9 is a system diagram for a system 000 for interactive visual education. The system 000 comprises a server 005. For example, the server 005 comprises one or more of a database, a processor, a computer, a tablet, and a mobile phone. The system 000 further comprises a network 010. The network 010 is operably connected to the server 005.

The system further comprises an external device 015 comprising a screen 016, the external device usable by a user 017, the external device 015 further configured to communicate with the server 005 using the network 010. The external device 015 is configured to receive input from the user 017. For example, the external device 015 is configured to upload to the server 005 via the network 010 the input received from the user 017. For example, the external device 015 comprises one or more of a database, a processor, a computer, a tablet, and a mobile phone. Alternatively, or additionally, the external device 015 is operably connected to the server 005 via a second network (not shown). In that case, the external device 015 uploads the input received from the user 017 to the server 005 via the second network (not shown)

The system further comprises an interactive visual education page 020 viewable by the user 017 using the external device 015, the interactive visual education page 020 comprising a top half page 025, the interactive visual education page further comprising a bottom half page 028, the top half page 025 comprising a visual teaching section 030 configured to teach the user 017 a lesson, the bottom half page 028 comprising an interactive tools page 040, the interactive tools page 040 comprising an interactive tool 050 usable with the external device 015 to interactively support the user in applying the lesson.

The server 005 is operably connected to storage 030. For example, the server 005 is operably connected to the storage 030 via the network 010. Alternatively, or additionally, the server 005 is operably connected to the storage 030 via the second network (not shown). Alternatively, or additionally, the server 005 is operably connected to the storage 030 via a third network (not shown).

FIGS. 1A-4 depict four examples of the system for interactive visual education applied to teaching a user game creation skills.

Figure 1A:
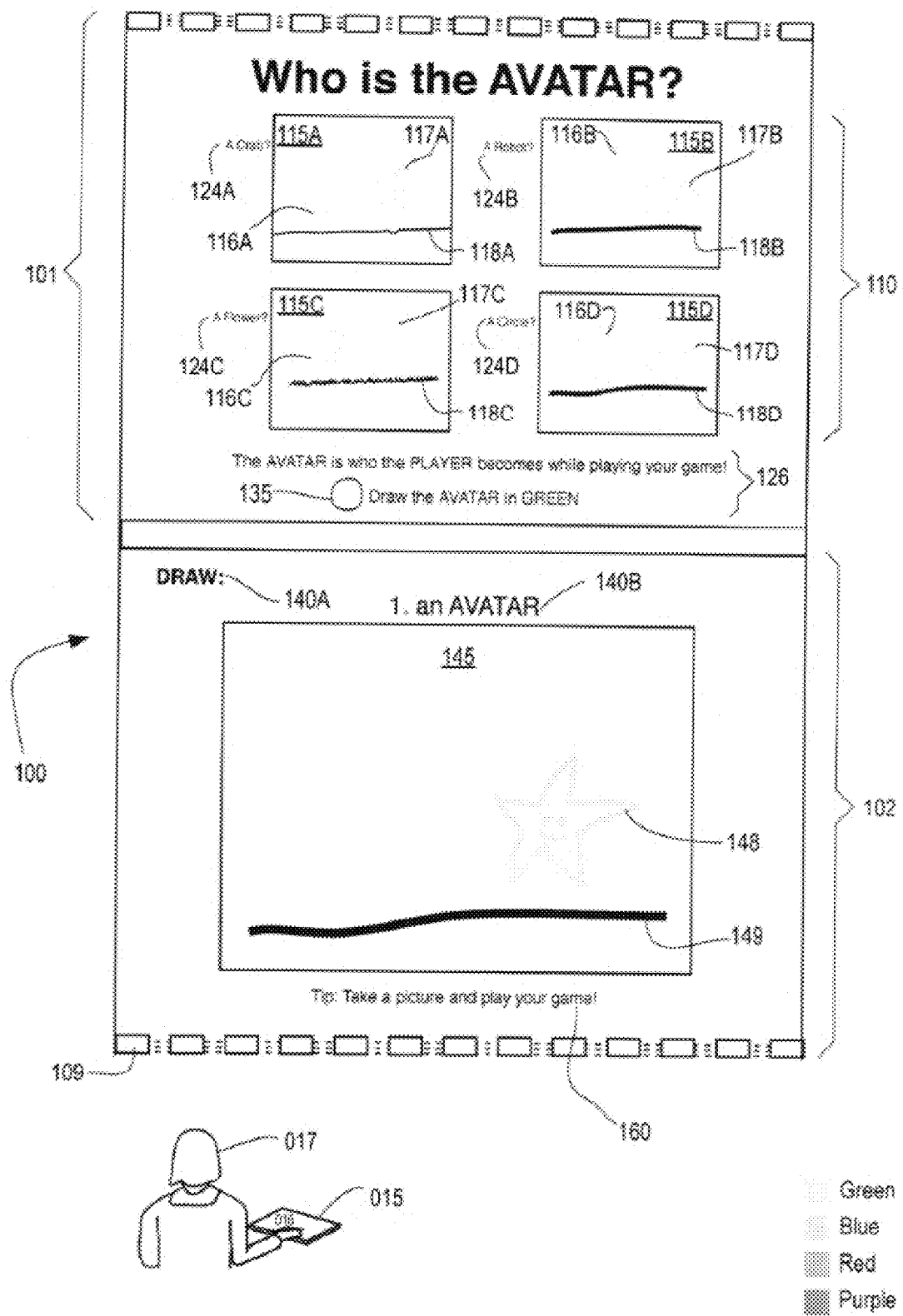
Figure 1B:
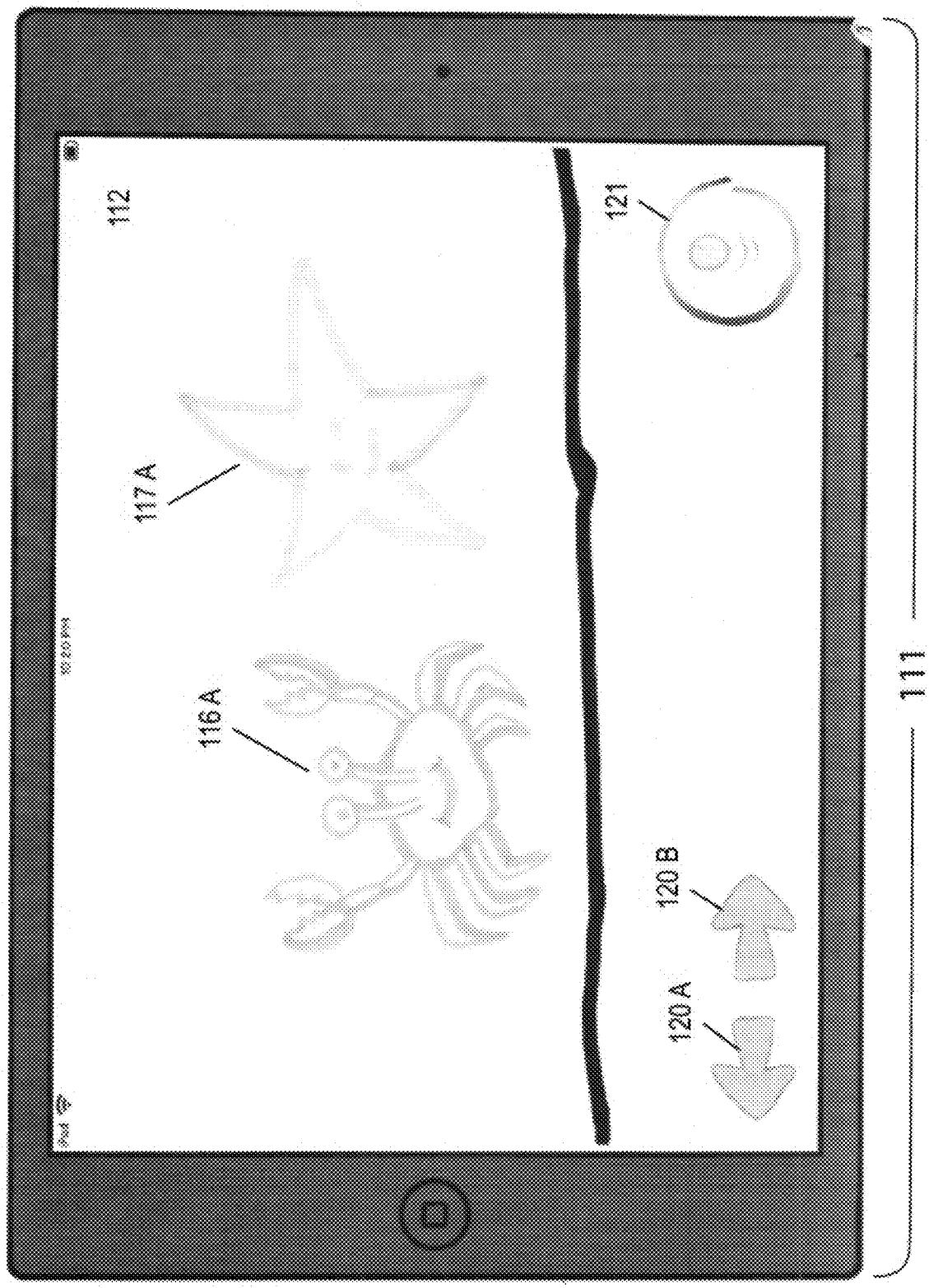

In FIGS. 1A and 1B, using the screen 016, the external device 015 displays to the user 017 an interactive visual education page 100.

The page 100 comprises a top half page 101. The page 100 further comprises a bottom half page 102. For example, the top half page 101 comprises a learning tools page configured to help the user 017 learn. For example, the bottom half page 102 comprises an interactive tools page configured to interactively support the user 017 in applying what the user has learned. For example, the interactive tools are configured to enable the user to play a game that will complement the lesson the system is teaching.

The page 100 further comprises a teaching prompt 105. As depicted, the top half page 101 comprises the teaching prompt 105. For example, the teaching prompt 105 comprises a lesson that is to be taught to a user 017. For example, the teaching prompt 105 comprises one or more of a question 105 and a statement 105. As depicted, the teaching prompt 105 comprises the question, "Who is the AVATAR?" The lesson being taught in this example involves the meaning of the term avatar.

The page 100 further comprises a visual teaching section 110. As depicted, the top half page 101 comprises the visual teaching section 110. For example, the visual teaching section 110 uses visual methods to teach the user 017 the lesson. As depicted, the visual teaching section 110 comprises a plurality of visual teaching slides 115A-115D configured to visually teach the user 017 the lesson. As depicted, the visual teaching section 110 comprises four visual teaching slides 115A-115D.

For example, while many variations are possible, a visual teaching slide comprises one or more of: an avatar icon controllable by the user to play a game; a goal icon representing a goal the avatar icon wishes to achieve to advance in the game; a boundary icon indicating boundaries outside of which or through which the avatar cannot go; a hazard icon impeding the avatar from achieving the goal; and a movable object configured to affect game play, the movable object configured to be subject to translation in space by the avatar icon. For example, a distinct color is used to distinguish one or more of the avatar icon, the goal icon, the boundary icon, the hazard icon, and the movable object icon.

As depicted, the first visual teaching slide 115A comprises a crab avatar icon 116A. For example, the system displays the crab avatar icon 116A using a green color. For example, as the user 017 plays the game, the user controls the crab avatar icon 116A. Generally, the user plays the game by controlling whatever avatar icon is available. The system thereby interactively teaches the user the lesson.

As depicted, the first visual teaching slide 115A further comprises a starfish goal icon 117A. For example, the system displays the starfish goal icon 117A in a blue color. As depicted, the first visual teaching slide 115A further comprises a ground boundary icon 118A. For example, the system displays the ground boundary icon 118A in a black color.

As depicted, the second visual teaching slide 115b comprises a robot avatar icon 116B. For example, the system displays the robot avatar icon 116B using a green color. As depicted, the second visual teaching slide 115b further comprises the starfish goal icon 117A. For example, the system again displays the starfish goal icon 117A in the blue color. As depicted, the second visual teaching slide 115b further comprises the ground boundary icon 118A. For example, the system again displays the ground boundary icon 118A in the black color.

As depicted, the third visual teaching slide 115C comprises a flower avatar icon 116C. For example, the system displays the flower avatar icon 116C using a green color. As depicted, the third visual teaching slide 115C further comprises a raindrop goal icon 117B. For example, the system displays the raindrop goal icon 117B using a blue color. As depicted, the third visual teaching slide 115C further comprises the ground boundary icon 118A. For example, the system again displays the ground boundary icon 118A in the black color.

As depicted, the fourth visual teaching slide 115D comprises a human avatar icon 116D. For example, the system displays the human avatar icon 116D using a green color. As depicted, the fourth visual teaching slide 115D further comprises the starfish goal icon 117A. For example, the system again displays the starfish goal icon 117A in the blue color. As depicted, the fourth visual teaching slide 115D further comprises the ground boundary icon 118A. For example, the system again displays the ground boundary icon 118A in the black color.

The visual teaching section 110 further comprises a first caption 124A that is associated with the first visual teaching slide 115A. For example, the first caption 124A provides a possible answer to a question asked about the first visual teaching slide 115A in the teaching prompt 105. As mentioned above, the teaching prompt 105 asks the question, "Who is the AVATAR?" As depicted, the first caption 124A comprises the words, "A Crab?," one possible answer to the question comprised in the teaching prompt 105, a possible answer 124A that is illustrated by the first visual teaching slide 115A.

Similarly, the visual teaching section 110 further comprises a second caption 124B that is associated with the second visual teaching slide 115B. For example, the second caption 124B provides a possible answer to a question asked about the second visual teaching slide 115B in the teaching prompt 105. As mentioned above, the teaching prompt 105 asks the question, "Who is the AVATAR?" As depicted, the second caption 124B comprises the words, "A Robot?," one possible answer to the question comprised in the teaching prompt 105, a possible answer 124B that is illustrated by the second visual teaching slide 115B.

Again, the visual teaching section 110 further comprises a third caption 122C that is associated with the third visual teaching slide 115C. For example, the third caption 122C provides a possible answer to a question asked about the third visual teaching slide 115C in the teaching prompt 105. As mentioned above, the teaching prompt 105 asks the question, "Who is the AVATAR?" As depicted, the third caption 122C comprises the words, "A Flower?," one possible answer to the question comprised in the teaching prompt 105, a possible answer 122C that is illustrated by the third visual teaching slide 115C.

Along the same lines, the visual teaching section 110 further comprises a fourth caption 122D that is associated with the fourth visual teaching slide 115D. For example, the fourth caption 122D comprises a possible answer to a question asked about the fourth visual teaching slide 115D in the teaching prompt 105. As mentioned above, the teaching prompt 105 asks the question, "Who is the AVATAR?" As depicted, the fourth caption 122D comprises the words, "A Circle?," a possible answer to the question comprised in the teaching prompt 105, a possible answer 122D that is illustrated by the fourth visual teaching slide 115D.

The page 100 further comprises a description section 126. For example, the description section 126 comprises a description of the lesson the system is teaching. For example, the description section 126 comprises one or two sentences. For example, the description section 126 comprises one or two paragraphs of text. For example, the description section 126 reinforces to the user 017 ideas addressed by the visual teaching section 110. For example, the description section 126 comprises one or more of a learning tip 130 configured to advise the user regarding the lesson and a task 135 that the user is asked to perform to learn more about the lesson. As depicted, the description section 126 comprises both a learning tip 130 and a task 135. As depicted, the learning tip 130 comprises the words, "The AVATAR is who the PLAYER becomes while playing your game!" As depicted, the task 135 comprises the words, "Draw the AVATAR in GREEN."

The page 100 further comprises a first action prompt 140A. As depicted, the bottom half page 102 comprises the first action prompt 140A. The first action prompt 140A is configured to prompt the user 017 to perform an action. The first action prompt 140A is configured to offer the user 017 an opportunity to participate in the learning process by performing one or more of guiding the user on what to do, engaging the user with the lesson, and letting the user express the lesson in his or her own way.

As depicted, the first action prompt 140A comprises a word, "Draw." As depicted, the first action prompt 140A is configured to prompt the user 017 to perform the action of drawing.

The page 100 further comprises a second action prompt 140B. As depicted, the bottom half page 102 comprises the second action prompt 140B. The second action prompt 140B is configured to prompt the user 017 to perform an action. The second action prompt 140B is configured to offer the user 017 an opportunity to participate in the learning process by performing one or more of guiding the user on what to do, engaging the user with the lesson, and letting the user express the lesson in his or her own way.

As depicted, the second action prompt 140B comprises the words, "1. An AVATAR." As depicted, the second action prompt 140B is configured to prompt the user 017 to perform the action of drawing an avatar.

The page 100 further comprises an action region 145. As depicted, the bottom half page 102 comprises the action region 145. The action region 145 is configured to provide the user 017 with an interactive area 145 in which the user 017 can execute the action comprised in the action prompt 140. For example, the interactive area 145 is configured to allow the user 017 to do one or more of draw a picture and perform an action. For example, the interactive area 145 is configured to do one or more of interactively support the user 017 in applying what the user has learned. For example, the interactive tools are configured to enable the user to play a game that will complement the lesson the system is teaching.

As depicted, the action region 145 comprises a second starfish icon 148. As depicted, the action region 145 comprises a second ground boundary icon 149.

Optionally, the page 100 further comprises a closing tip 160. As depicted, the bottom half page 102 comprises the closing tip 160. The optional closing tip 160 comprises information regarding the lesson. For example, the optional closing tip 160 further comprises an action region 145. For example, the optional closing tip reinforces the lesson conveyed by the page 100. For example, the optional closing tip 160 reinforces the lesson conveyed by the action region 145.

As depicted, the closing tip 160 comprises the words, "Tip: Take a picture and play your game!" The closing tip 160 thereby prompts the user 017 to take a picture of their drawing in order to play it, as outlined more fully in the patent application "CODELESS VIDEO GAME DEVELOPMENT PLATFORM," by Horstman, co-filed herewith.

In FIG. 2, using the screen 016, the external device 015 displays to the user 017 an interactive visual education page 200.

The page 200 comprises a top half page 201. The page 200 further comprises a bottom half page 202. For example, the top half page 201 comprises a learning tools page configured to help the user 017 learn. For example, the bottom half page 202 comprises an interactive tools page configured to interactively support the user 017 in applying what the user has learned.

The page 200 further comprises a teaching prompt 205. As depicted, the top half page 201 comprises the teaching prompt 205. For example, the teaching prompt 205 comprises a lesson that is to be taught to a user 017. For example, the teaching prompt 205 comprises one or more of a question 205 and a statement 205. As depicted, the teaching prompt 205 comprises the question, "What are some common mistakes?" The lesson being taught in this example involves correcting mistakes the user makes in designing a game.

The page 200 further comprises a visual teaching section 210. As depicted, the top half page 201 comprises the visual teaching section 210. For example, the visual teaching section 210 uses visual methods to teach the user 017 the lesson. As depicted, the visual teaching section 210 comprises a plurality of visual teaching slides 215A-215D. As depicted, the visual teaching section 210 comprises four visual teaching slides 215A-215D.

As depicted, the first visual teaching slide 215A comprises an open-jaw avatar icon 216A. For example, the system displays the open-jaw avatar icon 216A using a green color. As depicted, the first visual teaching slide 215A further comprises food goal icons 217A. For example, the system displays the food goal icons 217A in a blue color. As depicted, the first visual teaching slide 215A further comprises passageway boundary icons 218A. For example, the system displays the passageway boundary icons 218A in a black color. As depicted, the first visual teaching slide 215A further comprises a crooked line hazard icon 219A. For example, the system displays the crooked line hazard icon 219A in a red color.

As depicted, the second visual teaching slide 215B comprises a dot avatar icon 216B. For example, the system displays the dot avatar icon 216B using a green color. As depicted, the second visual teaching slide 215B further comprises two stairway dot goal icons 217B. For example, the system again displays the stairway dot goal icons 217B in the blue color. As depicted, the second visual teaching slide 215B further comprises two star goal icons 217C. For example, the system again displays the star goal icons 217C in the blue color.

As depicted, the second visual teaching slide 215B further comprises first lava line hazard icons 219B. For example, the system displays the first lava line hazard icons 219B in a red color. As depicted, the second visual teaching slide 215B further comprises a fire hazard icon 219C. For example, the system displays the fire hazard icon 219C in a red color. As depicted, the second visual teaching slide 215B further comprises second lava line hazard icons 219D. For example, the system displays the second lava line hazard icons 219D in a red color.

As depicted, the second visual teaching slide 215B further comprises a track boundary 218B. For example, the system displays the track boundary 218B using a black color.

As depicted, the third visual teaching slide 215C comprises a human avatar icon 216C. For example, the system displays the human avatar icon 216C using a green color. As depicted, the third visual teaching slide 215C further comprises a carrot goal icon 217D. For example, the system displays the carrot goal icon 217D using a blue color. As depicted, the third visual teaching slide 215C further comprises a border boundary icon 218C. For example, the system again displays the border boundary icon 218C in the black color.

As depicted, the third visual teaching slide 215C further comprises a first ghost hazard icon 219E. For example, the system displays the first ghost hazard icon 219E using a red color. As depicted, the third visual teaching slide 215C further comprises a second ghost hazard icon 219F. For example, the system displays the second ghost hazard icon 219F using a red color. As depicted, the third visual teaching slide 215C further comprises a third ghost hazard icon 219G. For example, the system displays the third ghost hazard icon 219G using a red color. As depicted, the third visual teaching slide 215C further comprises a fourth ghost hazard icon 219H. For example, the system displays the fourth ghost hazard icon 219H using a red color. As depicted, the third visual teaching slide 215C further comprises a fifth ghost hazard icon 219I. For example, the system displays the fifth ghost hazard icon 219I using a red color. As depicted, the third visual teaching slide 215C further comprises a dog hazard icon 219J. For example, the system displays the dog hazard icon 219J using a red color.

As depicted, the fourth visual teaching slide 215D comprises a canine avatar icon 216D. For example, the system displays the canine avatar icon 216D using a green color. As depicted, the fourth visual teaching slide 215D further comprises a food bowl goal icon 217E. For example, the system again displays the food bowl goal icon 217E in the blue color. As depicted, the fourth visual teaching slide 215D further comprises an avatar restraint boundary icon 218D. For example, the system again displays the avatar restraint boundary icon 218D in the black color. As depicted, the fourth visual teaching slide 215D further comprises a ground boundary icon 218E. For example, the system again displays the ground boundary icon 218E in the black color. As depicted, the canine avatar 216D is stuck between the avatar restraint boundary icon 218D and the ground boundary icon 218E.

As depicted, the fourth visual teaching slide 215D comprises a flying saucer hazard icon 219K. For example, the system displays the flying saucer hazard icon 219K using a red color. As depicted, the fourth visual teaching slide 215D further comprises two table leg movable objects 222A. For example, the system displays the table leg movable objects 222A using a purple color. As depicted, the fourth visual teaching slide 215D further comprises a tabletop movable object 222B. For example, the system displays the tabletop movable object 222B using a purple color.

The visual teaching section 210 further comprises a first caption 224A that is associated with the first visual teaching slide 215A. For example, the first caption 224A provides a possible answer to a question asked about the first visual teaching slide 215A in the teaching prompt 205. As mentioned above, the teaching prompt 205 asks the question, "What are some common mistakes?" As depicted, the first caption 224A comprises the words, "AVATAR is too big," a possible answer to the question comprised in the teaching prompt 205, a possible answer 224A that is illustrated by the first visual teaching slide 215A, which depicts the open-jaw avatar icon 216A that appears to be too big to successfully navigate the passageway boundary icons 218A in order to reach the food goal icons 217A.

Similarly, the visual teaching section 210 further comprises a second caption 224B that is associated with the second visual teaching slide 215B. For example, the second caption 224B provides a possible answer to a question asked about the second visual teaching slide 215B in the teaching prompt 205. As mentioned above, the teaching prompt 205 asks the question, "What are some common mistakes?" As depicted, the second caption 224B comprises the words, "GOAL out of reach?," a possible answer to the question comprised in the teaching prompt 205, a possible answer 224B that is illustrated by the second visual teaching slide 215B, which depicts the stairway dot goal icons 217B and the star goal icons 217C, only one of which can be successfully reached by the dot avatar icon 216B.

For example, if the dot avatar icon 216B reaches one of the stairway dot goal icons 217B on the left side of the drawing, the avatar will not then be able to access the stairway dot goal icons 217B on the right side of the drawing because of the lava line hazard icons 219B and the fire icon 219C as well as the hole in which the left-hand star goal icon 217C is located. For example, if the dot avatar icon 216B reaches one of the star goal icons 217C, each of which is located at the bottom of a hole, the dot avatar icon 216B will then not be able to get out of the hole to reach the other star goal icon 217C.

Again, the visual teaching section 210 further comprises a third caption 222C that is associated with the third visual teaching slide 215C. For example, the third caption 222C provides a possible answer to a question asked about the third visual teaching slide 215C in the teaching prompt 205. As mentioned above, the teaching prompt 205 asks the question, "What are some common mistakes?" As depicted, the third caption 222C comprises the words, "Too many HAZARDS?" a possible answer to the question comprised in the teaching prompt 205, a possible answer 222C that is illustrated by the third visual teaching slide 215C, which depicts a game that comprises six hazards 219E-219J and only one small goal 217D within a relatively small space, which may be fairly described as "too many hazards" in the game design.

Along the same lines, the visual teaching section 210 further comprises a fourth caption 222D that is associated with the fourth visual teaching slide 215D. For example, the fourth caption 222D comprises a possible answer to a question asked about the fourth visual teaching slide 215D in the teaching prompt 205. As mentioned above, the teaching prompt 205 asks the question, "What are some common mistakes?" As depicted, the fourth caption 222D comprises the words, "AVATAR gets stuck," a possible answer to the question comprised in the teaching prompt 205, a possible answer 222D that is illustrated by the fourth visual teaching slide 215D, which depicts the canine avatar icon 216D being stuck between the avatar restraint boundary icon 218D and the ground boundary icon 218E and thus unable to reach the food bowl goal icon 217E.

The page 200 further comprises a description section 226. For example, the description section 226 comprises a "tips and tricks" label 227. For example, the description section 226 comprises a description of the lesson the system is teaching. For example, the description section 226 comprises one or two sentences. For example, the description section 226 comprises one or two paragraphs of text. For example, the description section 226 reinforces to the user 017 ideas addressed by the visual teaching section 210.

For example, and as depicted, the description section 226 further comprises a first learning tip 230A, the first learning tip 230A configured to advise the user regarding the lesson. For example, and as depicted, the description section 226 further comprises a second learning tip 230B, the second learning tip 230B configured to advise the user regarding the lesson. For example, and as depicted, the description section 226 comprises a task 235 that the system asks the user 017 to perform to learn more about the lesson. As depicted, the description section 226 comprises the first learning tip 230A, the second learning tip 230B, and the task 235. As depicted, the first learning tip 230A comprises the words, "Erase a mistake by covering it with a scrap piece of paper." As depicted, the second learning tip 230B comprises the words, "You can always draw more onto your game and snap a new picture." As depicted, the task 235 comprises the words, "Move the camera further away from or closer to the paper."

The page 200 further comprises a first action prompt 240A. As depicted, the bottom half page 202 comprises the first action prompt 240A. The first action prompt 240A is configured to prompt the user 017 to perform an action. The first action prompt 240A is configured to offer the user 017 an opportunity to participate in the learning process by performing one or more of guiding the user on what to do, engaging the user with the lesson, and letting the user express the lesson in his or her own way.

As depicted, the first action prompt 240A comprises the words, "Draw your game!" As depicted, the first action prompt 240A is configured to prompt the user 017 to perform the action of drawing.

The page 200 further comprises a second action prompt 240B. As depicted, the bottom half page 202 comprises the second action prompt 240B. The second action prompt 240B is configured to prompt the user 017 to perform an action. The second action prompt 240B is configured to offer the user 017 an opportunity to participate in the learning process by performing one or more of guiding the user on what to do, engaging the user with the lesson, and letting the user express the lesson in his or her own way.

As depicted, the second action prompt 240B comprises the words, "All game designers make mistakes and that's how you LEARN." As depicted, the second action prompt 240B is configured to prompt the user 017 to understand that learning is achieved through making mistakes that teach lessons.

The page 200 further comprises an action region 245. As depicted, the bottom half page 202 comprises the action region 245. The action region 245 is configured to provide the user 017 with an interactive area 245 in which the action comprised in the action prompt 240 can be executed. For example, the interactive area 245 is configured to allow the user 017 to do one or more of draw a picture and perform an action. For example, the interactive area 245 is configured to do one or more of interactively support the user 017 in applying what the user has learned and reinforce the lesson. For example, the interactive tools are configured to enable the user to play a game that will complement the lesson the system is teaching.

Optionally, the page 200 further comprises a closing tip 260. As depicted, the bottom half page 202 comprises the closing tip 260. The optional closing tip 260 comprises information regarding the lesson. For example, the optional closing tip 260 further comprises an action region 245. For example, the optional closing tip reinforces the lesson conveyed by the page 200. For example, the optional closing tip 260 reinforces the lesson conveyed by the action region 245.

As depicted, the closing tip 260 comprises the words, "Design, Test and Fix your game to make it even better!" The closing tip 260 thereby prompts the user 017 to continually work at improving the user's game by doing one or more of designing, texting, and fixing the game, as outlined more fully in the patent application "CODELESS VIDEO GAME DEVELOPMENT PLATFORM," by Horstman, co-filed herewith.

Figure 3:
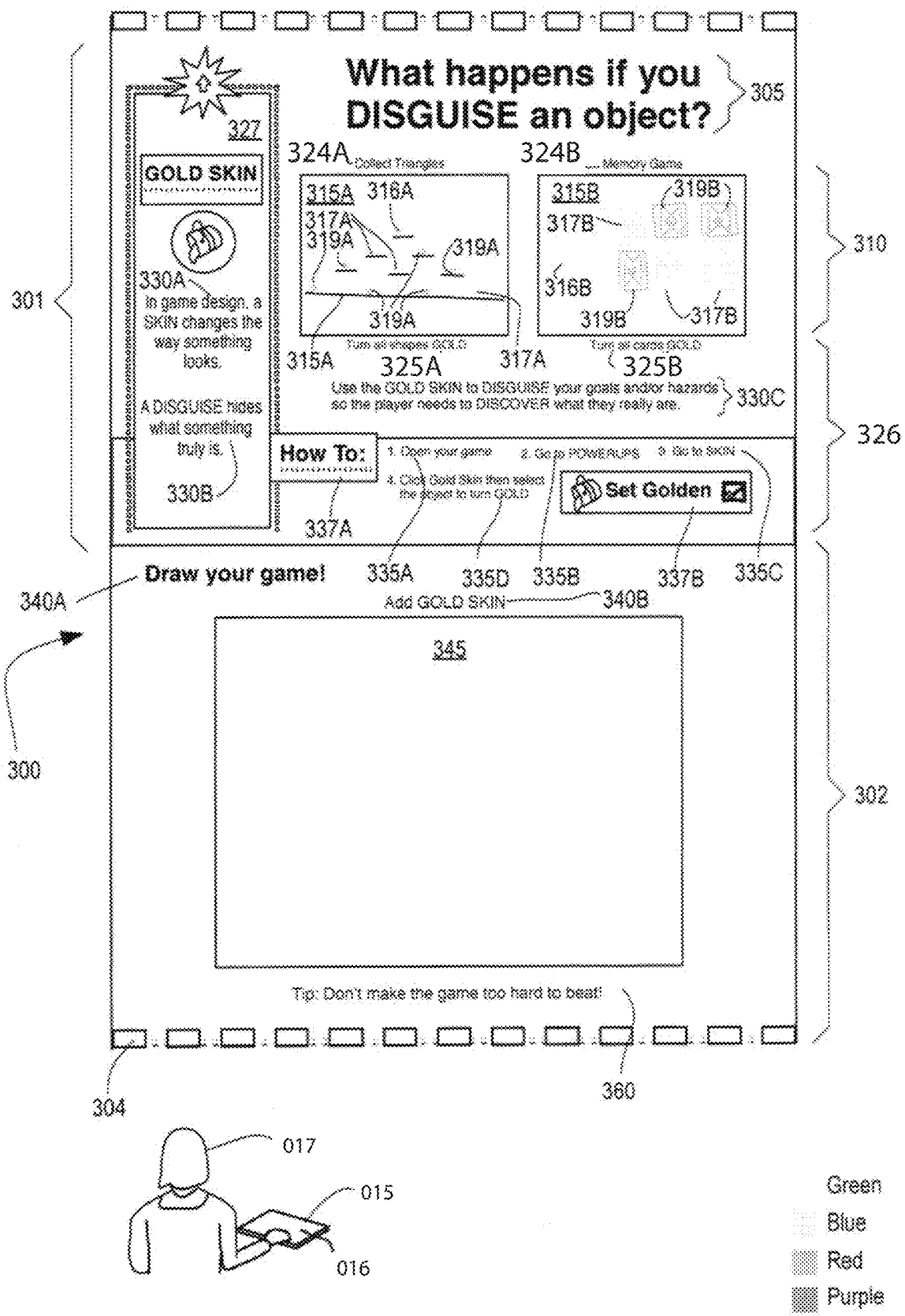

In FIG. 3, using the screen 016, the external device 015 displays to the user 017 an interactive visual education page 300.

The page 300 comprises a top half page 301. The page 300 further comprises a bottom half page 302. For example, the top half page 301 comprises a learning tools page configured to help the user 017 learn. For example, the bottom half page 302 comprises an interactive tools page configured to interactively support the user 017 in applying what the user 017 has learned.

The page 300 further comprises a teaching prompt 305. As depicted, the top half page 301 comprises the teaching prompt 305. For example, the teaching prompt 305 comprises a lesson that is to be taught to a user 017. For example, the teaching prompt 305 comprises one or more of a question 305 and a statement 305. As depicted, the teaching prompt 305 comprises the question, "What happens if you DISGUISE an object?" The lesson being taught in this example involves teaching the user 304 the important feature of disguising an object as part of designing a game.

The page 300 further comprises a visual teaching section 310. As depicted, the top half page 301 comprises the visual teaching section 310. For example, the visual teaching section 310 uses visual methods to teach the user 017 the lesson. As depicted, the visual teaching section 310 comprises a plurality of visual teaching slides 315A and 315B.

As depicted, the visual teaching section 310 comprises two visual teaching slides 315A and 315B.

As depicted, the first visual teaching slide 315A comprises a human avatar icon 316A. For example, the system displays the human avatar icon 316A using a green color. As depicted, the first visual teaching slide 315A further comprises triangle goal icons 317A. For example, the system displays the triangle goal icons 317A in a blue color. As depicted, the first visual teaching slide 315A further comprises a ground boundary icon 318A. For example, the system displays the ground boundary icon 318A in a black color. As depicted, the first visual teaching slide 315A further comprises square hazard icons 319A. For example, the system displays the square hazard icons 319A in a red color.

As depicted, the second visual teaching slide 315B comprises a hand avatar icon 316B. For example, the system displays the hand avatar icon 316B using a green color. As depicted, the second visual teaching slide 315B further comprises three playing card goal icons 317B. For example, the system displays the playing card goal icons 317B in a blue color.

As depicted, the second visual teaching slide 315B further comprises three playing card hazard icons 319B. For example, the system displays the playing card hazard icons 319B in a red color.

The visual teaching section 310 further comprises a first caption 324A that is associated with the first visual teaching slide 315A. For example, the first caption 324A provides a possible answer to a question asked about the first visual teaching slide 315A in the teaching prompt 305. As mentioned above, the teaching prompt 305 asks the question, "What happens if you DISGUISE an object?" As depicted, the first caption 324A comprises the words, "Collect Triangles," a possible answer to the question comprised in the teaching prompt 305, a possible answer 324A that is illustrated by the first visual teaching slide 315A.

Similarly, the visual teaching section 310 further comprises a second caption 324B that is associated with the second visual teaching slide 315B. For example, the second caption 324B provides a possible answer to a question asked about the second visual teaching slide 315B in the teaching prompt 305. As mentioned above, the teaching prompt 305 asks the question, "What happens if you DISGUISE an object?" As depicted, the second caption 324B comprises the words, "Memory Game," a possible answer to the question comprised in the teaching prompt 305, a possible answer 324B that is illustrated by the second visual teaching slide 315B.

The visual teaching section 310 further comprises a first tip 325A that is associated with and, as depicted, appears directly below, the first visual teaching slide 315A. For example, the first tip 325A provides a suggestion to the user 017 on implementing the question comprised in the teaching prompt 305, "What happens if you DISGUISE an object?" As depicted, the first tip 325A comprises the words, "Turn all shapes GOLD."

The visual teaching section 310 further comprises a second tip 325B that is associated with and, as depicted, appears directly below, the second visual teaching slide 315B. For example, the second tip 325B provides a suggestion to the user 017 on implementing the question comprised in the teaching prompt 305, "What happens if you DISGUISE an object?" As depicted, the second tip 325B comprises the words, "Turn all cards GOLD."

The page 300 further comprises a description section 326. For example, the description section 326 comprises a description of the lesson the system is teaching. For example, the description section 326 comprises one or two sentences. For example, the description section 326 comprises one or two paragraphs of text. For example, the description section 326 reinforces to the user 017 ideas addressed by the visual teaching section 310.

For example, and as depicted, the description section 326 comprises a "Powerups: Gold Skin" section 327. The "Powerups: Gold Skin" section 327 comprises a first learning tip 330A, the first learning tip 330A configured to advise the user 017 regarding the lesson. For example, and as depicted, the "Powerups: Gold Skin" section 327 further comprises a second learning tip 330B, the second learning tip 330B configured to advise the user 017 regarding the lesson. As depicted, the first learning tip 330A comprises the words, "In game design, a SKIN changes the way something looks." As depicted, the second learning tip 330B comprises the words, "A DISGUISE hides what something truly is."

As depicted, the description section 326 instructs the user 017 as to how to disguise as gold for the player (not shown) one or more of playing card goal icons 317A and playing card hazard icons 319A. As depicted, the description section 326 instructs the user 017 as to how to disguise all shapes, that is, how to disguise as gold for the player (not shown) all playing card goal icons 317A and all playing card hazard icons 319A. This creates a game in which the player will not be able to tell the color and thus the identity of one or more of the playing card goal icons 317A and the playing card hazard icons 319A. Preferably, this creates a game in which the player will not be able to tell the color and thus the identity of all the playing card goal icons 317A and all the playing card hazard icons 319A.

For example, and as depicted, the description section 326 further comprises a third learning tip 330C, the third learning tip 330C configured to advise the user 017 regarding the lesson. As depicted, the third learning tip 330C comprises the words, "Use the GOLD SKIN to DISGUISE your goals and/or hazards so the player needs to DISCOVER what they really are."

For example, and as depicted, the description section 326 further comprises tasks 335A-335D that the system asks the user 017 to perform to learn more about the lesson. For example, the system prefers that the user 017 perform the tasks 335A-335D in an order specified by the order of the tasks 335A-335D. Alternatively, or additionally, the user 017 performs the tasks 335A-335D in any desired order. As depicted, the first task 335A comprises the words, "Open your game." As depicted, the second task 335B comprises the words, "Go to POWERUPS." As depicted, the third task 335C comprises the words, "Go to SKIN." As depicted, the fourth task 335D comprises the words, "Click Gold Skin then select the object to turn GOLD."

For example, and as depicted, the description section 326 further comprises a first task label 337A configured to describe one or more of the tasks 335A-335D and a second task label 337B configured to describe one or more of the tasks 335A-335D. As depicted, the first task label 337A comprises the words, "How To:." As depicted, the second task 335B comprises the words, "Set Golden."

The page 300 further comprises a first action prompt 340A. As depicted, the bottom half page 302 comprises the first action prompt 340A. The first action prompt 340A is configured to prompt the user 017 to perform an action. The first action prompt 340A is configured to offer the user 017 an opportunity to participate in the learning process by performing one or more of guiding the user on what to do, engaging the user with the lesson, and letting the user express the lesson in his or her own way.

As depicted, the first action prompt 340A comprises the words, "Draw your game!" As depicted, the first action prompt 340A is configured to prompt the user 017 to perform the action of drawing.

The page 300 further comprises a second action prompt 340B. As depicted, the bottom half page 302 comprises the second action prompt 340B. The second action prompt 340B is configured to prompt the user 017 to perform an action. The second action prompt 340B is configured to offer the user 017 an opportunity to participate in the learning process by performing one or more of guiding the user on what to do, engaging the user with the lesson, and letting the user express the lesson in his or her own way.

As depicted, the second action prompt 340B comprises the words, "Add GOLD SKIN." As depicted, the second action prompt 340B is configured to prompt the user 017 to do one or more of create the game and add gold skin to one or more game elements to disguise those elements.

The page 300 further comprises an action region 345. As depicted, the bottom half page 302 comprises the action region 345. The action region 345 is configured to provide the user 017 with an interactive area 345 in which the action comprised in the action prompt 340 can be executed. For example, the interactive area 345 is configured to allow the user 017 to do one or more of draw a picture and perform an action. For example, the interactive area 345 is configured to do one or more of interactively support the user 017 in applying what the user has learned and reinforce the lesson. For example, the interactive tools are configured to enable the user to play a game that will complement the lesson the system is teaching.

Optionally, the page 300 further comprises a closing tip 360. As depicted, the bottom half page 302 comprises the closing tip 360. The optional closing tip 360 comprises information regarding the lesson. For example, the optional closing tip 360 further comprises an action region 345. For example, the optional closing tip reinforces the lesson conveyed by the page 300. For example, the optional closing tip 360 reinforces the lesson conveyed by the action region 345.

As depicted, the closing tip 360 comprises the words, "TIP: Don't make the game too hard to beat!" The closing tip 360 thereby prompts the user 017 to continually work at improving the user's game by doing one or more of designing, texting, and fixing the game, as outlined more fully in the patent application "CODELESS VIDEO GAME DEVELOPMENT PLATFORM," by Horstman, co-filed herewith.

Figure 4:
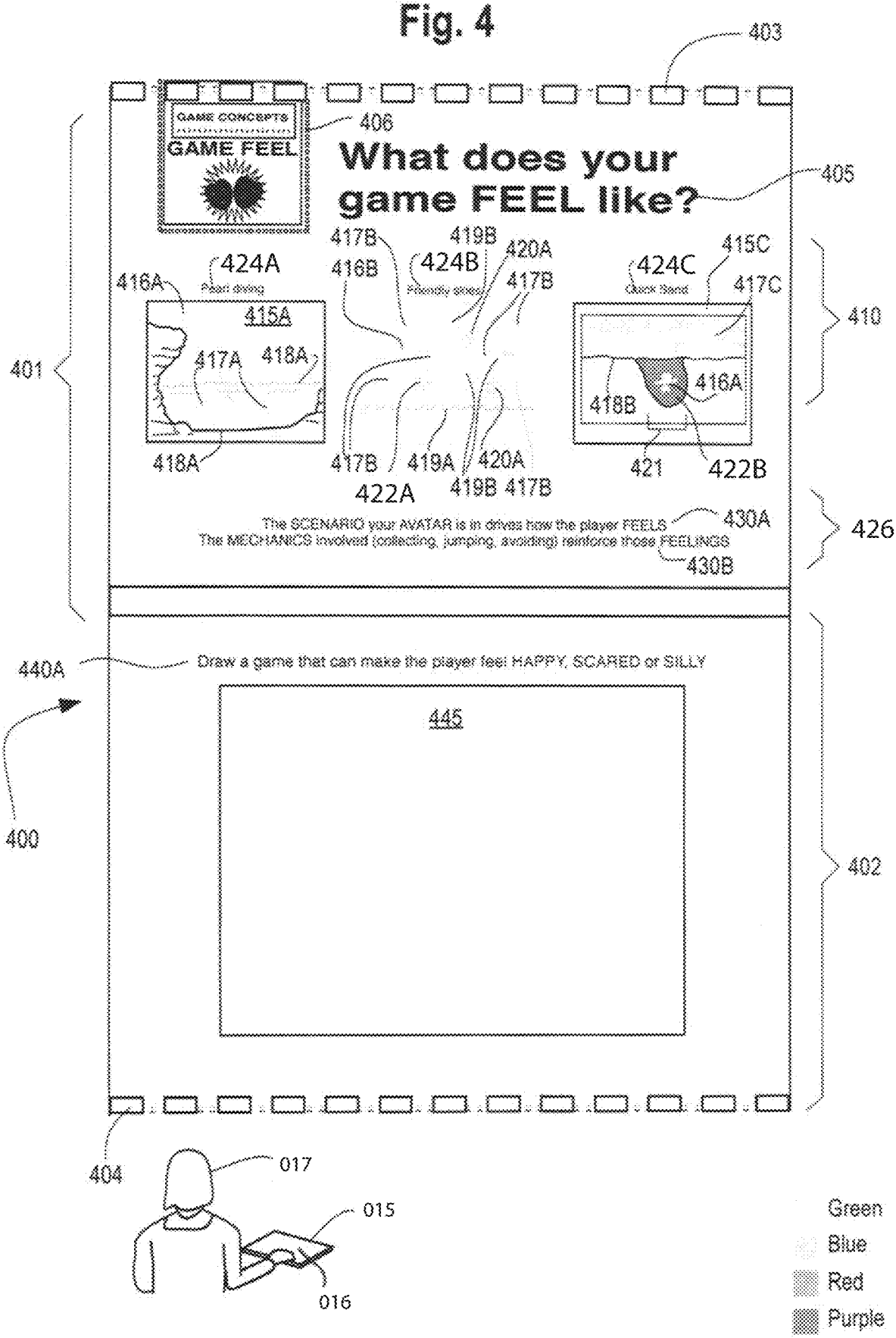

In FIG. 4 using the screen 016, the external device 015 displays to the user 017 an interactive visual education page 400.

The page 400 comprises a top half page 401. The page 400 further comprises a bottom half page 402. For example, the top half page 401 comprises a learning tools page configured to help the user 017 learn. For example, the bottom half page 402 comprises an interactive tools page configured to interactively support the user 017 in applying what the user has learned.

The page 400 further comprises a teaching prompt 405. As depicted, the top half page 401 comprises the teaching prompt 405. For example, the teaching prompt 405 comprises a lesson that is to be taught to a user 017. For example, the teaching prompt 405 comprises one or more of a question 405 and a statement 405. As depicted, the teaching prompt 405 comprises the question, "What does your game FEEL like?" The lesson being taught in this example involves teaching the user 404 the important feature of developing the feel the game has to a player (not shown).

For example, and as depicted, the top half page 401 further comprises a page label 406 configured to describe the page 400. As depicted, the page label 406 comprises the words, "Game Concept: Game Feel." As depicted, the page label 406 further comprises a decorative icon depicting two harlequin-type masks.

The page 400 further comprises a visual teaching section 410. As depicted, the top half page 401 comprises the visual teaching section 410. For example, the visual teaching section 410 uses visual methods to teach the user 017 the lesson. As depicted, the visual teaching section 410 comprises a plurality of visual teaching slides 415A-415C. As depicted, the visual teaching section 410 comprises three visual teaching slides 415A-415C.

As depicted, the first visual teaching slide 415A comprises a human avatar icon 416A. As depicted, the human avatar icon 416A is in the process of jumping off a cliff. For example, the system displays the human avatar icon 416A using a green color. As depicted, the first visual teaching slide 415A further comprises oyster goal icons 417A. For example, the system displays the oyster goal icons 417A in a blue color. As depicted, the first visual teaching slide 415A further comprises a cliff and sea bottom boundary icon 418A. For example, the system displays the cliff and sea bottom boundary icon 418A in a black color. As depicted, the first visual teaching slide 415A further comprises a water hazard icon 419A. For example, the system displays the water hazard icon 419A in a red color. The feeling conveyed by the first visual teaching slide 415A depicting the cliff and sea boundary icon 418A and the human avatar icon 416A apparently intending to jump off the cliff comprises nervousness.

As depicted, the second visual teaching slide 415B comprises an airplane avatar icon 416B. For example, the system displays the airplane avatar icon 416B using a green color. Preferably, although not necessarily, the system presents the game without gravity, enabling the airplane avatar icon 416B to freely move one or more of upwards, downwards, leftwards, and rightwards. As depicted, the second visual teaching slide 415B further comprises six cloud goal icons 417C. For example, the system displays the cloud goal icons 417C in a blue color.

As depicted, the second visual teaching slide 415B further comprises a water hazard icon 419AB. For example, the system displays the water hazard icon 419A in a red color. As depicted, the second visual teaching slide 415B further comprises two bird hazard icons 419B. For example, the system displays the bird hazard icons 419B in a red color.

As depicted, the second visual teaching slide 415B further comprises three hot air balloon movable objects 422A. For example, the system displays the hot air balloon movable objects 422A using a purple color. The feeling conveyed by the second visual teaching slide 415B depicting the cloud goals 417B and the airplane avatar icon 416B and the bird hazard icons 419B and the hot air balloon movable objects 422A comprises freedom.

As depicted, the third visual teaching slide 415C again comprises the human avatar icon 416A. For example, the system displays the human avatar icon 416A using a green color. As depicted, the third visual teaching slide 415C further comprises a vine goal icon 417C. For example, the system displays the vine goal icon 417C using a blue color. As depicted, the third visual teaching slide 415C further comprises a ground boundary icon 418B. For example, the system displays the ground boundary icon 418B in the black color.

As depicted, the third visual teaching slide 415C further comprises quicksand movable object 422B. For example, the system displays the quicksand movable object 422B using a purple color. As depicted in the third visual teaching slide 415C, the human avatar icon 416A is positioned amidst the quicksand movable object 422B near a hole 423 formed by the ground boundary icon 418B. The system has the capability to display the quicksand movable object 422B so that when the human avatar icon 416A leaves the quicksand movable object 422B, the quicksand movable object 422B sprays around just as real quicksand does. The feeling conveyed by the third visual teaching slide 415C depicting the quicksand movable object 422B and the hole 423 comprises one or more of stress and tension.

The visual teaching section 410 further comprises a first caption 424A that is associated with the first visual teaching slide 415A. For example, the first caption 424A provides a possible answer to a question asked about the first visual teaching slide 415A in the teaching prompt 405. As mentioned above, the teaching prompt 405 asks the question, "What does your game FEEL like?" As depicted, the first caption 424A comprises the words, "Pearl diving," a possible answer to the question comprised in the teaching prompt 405, a possible answer 424A that is illustrated by the first visual teaching slide 415A, more specifically by the human avatar icon 416A that is diving as the human avatar icon 416A attempts to reach the oyster goal icons 417A.

Similarly, the visual teaching section 410 further comprises a second caption 424B that is associated with the second visual teaching slide 415B. For example, the second caption 424B provides a possible answer to a question asked about the second visual teaching slide 415B in the teaching prompt 405. As mentioned above, the teaching prompt 405 asks the question, "What does your game FEEL like?" As depicted, the second caption 424B comprises the words, "Friendly skies," a possible answer to the question comprised in the teaching prompt 405, a possible answer 424B that is illustrated by the second visual teaching slide 415B, more specifically by one or more of the airplane avatar icon 416B, the cloud goals 417B, the bird hazard icons 4196, and the hot air balloon movable objects 422A.

Along the same lines, the visual teaching section 410 further comprises a third caption 422C that is associated with the third visual teaching slide 415C. For example, the third caption 422C provides a possible answer to a question asked about the third visual teaching slide 415C in the teaching prompt 405. As mentioned above, the teaching prompt 405 asks the question, "What does your game FEEL like?" As depicted, the third caption 422C comprises the word, "Quicksand," a possible answer to the question comprised in the teaching prompt 405, a possible answer 422C that is illustrated by the third visual teaching slide 415C, more specifically by one or more of the quicksand moveable object 422B and the hole 423.

The page 400 further comprises a description section 426. For example, the description section 426 comprises a description of the lesson the system is teaching. For example, the description section 426 comprises one or two sentences. For example, the description section 426 comprises one or two paragraphs of text. For example, the description section 426 reinforces to the user 017 ideas addressed by the visual teaching section 410.

For example, and as depicted, the description section 426 comprises a first learning tip 430A, the first learning tip 430A configured to advise the user 017 regarding the lesson. For example, and as depicted, the description section 426 further comprises a second learning tip 430B, the second learning tip 430B configured to advise the user 017 regarding the lesson. As depicted, the first learning tip 430A comprises the words, "The SCENARIO your AVATAR is in drives how the player FEELS." As depicted, the second learning tip 430B comprises the words, "The MECHANICS involved (collecting, jumping, avoiding) reinforce those FEELINGS."

The page 400 further comprises an action prompt 440. As depicted, the bottom half page 402 comprises the action prompt 440. The action prompt 440 is configured to prompt the user 017 to perform an action. The action prompt 440 is configured to offer the user 017 an opportunity to participate in the learning process by performing one or more of guiding the user on what to do, engaging the user with the lesson, and letting the user express the lesson in his or her own way.

As depicted, the action prompt 440 comprises the words, "Draw a game that can make the player feel HAPPY, SCARED or SILLY." As depicted, the action prompt 440 is configured to prompt the user 017 to perform the action of drawing.

The page 400 further comprises an action region 445. As depicted, the bottom half page 402 comprises the action region 445. The action region 445 is configured to provide the user 017 with an interactive area 445 in which the action comprised in the action prompt 440 can be executed. For example, the interactive area 445 is configured to allow the user 017 to do one or more of draw a picture and perform an action. For example, the interactive area 445 is configured to do one or more of interactively support the user 017 in applying what the user has learned and reinforce the lesson. For example, the interactive tools are configured to enable the user to play a game that will complement the lesson the system is teaching.

Figure 5:
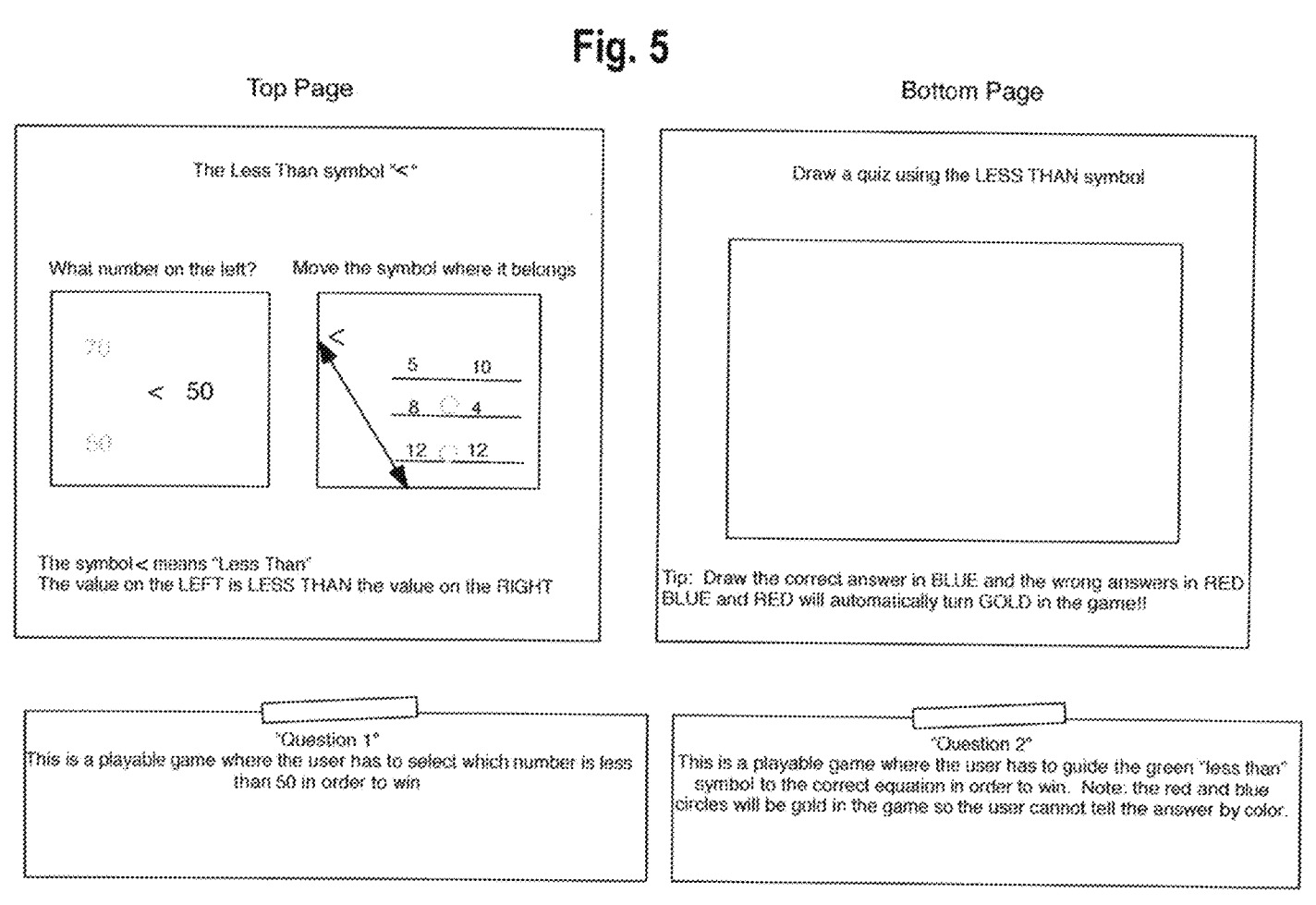

In FIG. 5, using the screen 016, the system 500 comprising the external device 015 for interactive visual education is applied to teaching a user mathematics.

The system 500 comprises an interactive visual education page 501. The interactive visual education page 501 comprises a left half page 502. The interactive visual education page 501 further comprises a right half page 503. For example, the left half page 502 comprises a learning tools page 502 configured to help a user 504 learn. For example, the right half page 503 comprises an interactive tools page 503 configured to interactively support the user 504 in applying what the user 504 has learned.

The interactive visual education page 501 further comprises a teaching prompt 505. As depicted, the learning tools page 502 comprises the teaching prompt 505. For example, the teaching prompt 505 comprises a lesson that is to be taught to the user 504. For example, the teaching prompt 505 comprises one or more of a question 505 and a statement 505. As depicted, the teaching prompt 505 comprises the words, "The Less Than symbol '<'." The lesson being taught in this example involves teaching a user the mathematical meaning of the "less than" symbol.

The interactive visual education page 501 further comprises a visual teaching section 510. As depicted, the learning tools page 502 comprises the visual teaching section 510. For example, the visual teaching section 510 uses visual methods to teach the user 504 the lesson. The system 500 further comprises an external device 511 usable by the user 504 to do one or more of provide input to the system 500 and create a game using the system 500. The external device 511 comprises an external device screen 512. The external device 511 is further configured to communicate with a server (not shown in this figure) using a network (not shown in this figure). The external device 511 is configured to receive input from the user 504. For example, the external device 511 is configured to upload to the server (not shown) via the network (not shown) the input received from the user 504. For example, the external device 511 comprises one or more of a database, a processor, a computer, a tablet, and a mobile phone.

For example, as depicted, the external device comprises a left arrow 512, which, if the player selects it, moves the avatar 203 to the left. The first consumer page 235 further comprises a right arrow 237, which, if the player selects it, moves the avatar 203 to the right. The first consumer page 235 further comprises a jump button 238, which, if the player selects it, causes the avatar 203 to jump upwards.

As depicted, the visual teaching section 510 comprises a plurality of visual teaching slides 515A-515B. As depicted, the visual teaching section 510 comprises two visual teaching slides 515A-515B.

As depicted, the first visual teaching slide 515A comprises a mathematical game 515A. As depicted, the first visual teaching slide 515A comprises a first mathematical expression 516A. As depicted, the mathematical expression 516A comprises a first mathematical expression left side 517A, a "less than" sign 518A, and a first mathematical expression right side 519A. As depicted, the first mathematical expression left side 517A comprises the numbers 70, 20, and 50. For example, the numbers 70 and 50 comprised in the first mathematical expression left side 517 are both depicted in a red color. For example, the number 20 comprised in the first mathematical expression left side 517A is depicted in a green color. For example, the "less than" sign 518A is depicted in a black color. As depicted, the first mathematical expression right side 519A comprises the number 50. For example, the number 50 comprises in the first mathematical expression right side 519 is depicted in a black color. From the red and green colors used in the first mathematical expression left side 517, the user 504 learns that 20 is the correct answer because it is depicted in the green color. Using the external device 511, the user 504 may play a video game comprised in the first visual teaching slide 515A, as outlined more fully in the patent application "CODELESS VIDEO GAME DEVELOPMENT PLATFORM," by Horstman, co-filed herewith.

As depicted, the second visual teaching slide 515B comprises a mathematical game 515B. As depicted, the second visual teaching slide 515B comprises three mathematical expressions 516B-516D. Using the external device 511, the user 504 plays the game comprised in the second visual teaching slide 515B, as outlined more fully in the patent application "CODELESS VIDEO GAME DEVELOPMENT PLATFORM," by Horstman, co-filed herewith.

As depicted, the second mathematical expression 516B comprises a second mathematical expression left side 517B, a second mathematical expression answer bubble 518B, and a second mathematical expression right side 519B. As depicted, the second mathematical expression left side 517B comprises the number 5. As depicted, the second mathematical expression left side 517B is depicted using a black color. As depicted, the second mathematical expression answer bubble 518B is depicted in a blue color, signaling to the user 504 that the second mathematical expression answer bubble 518B represents the correct answer. As depicted, the second mathematical expression right side 519B comprises the number 10. As depicted, the second mathematical expression right side 519B is depicted using a black color.

As depicted, the third mathematical 516C comprises a third mathematical left side 517C, a third mathematical answer bubble 518C, and a third mathematical right side 519C. As depicted, the third mathematical left side 517C comprises the number 5. As depicted, the third mathematical left side 517C is depicted using a black color. As depicted, the third mathematical answer bubble 518C is depicted in a red color, signaling to the user 504 that the third mathematical expression answer bubble 518C represents an incorrect answer. As depicted, the third mathematical right side 519C comprises the number 10. As depicted, the third mathematical right side 519C is depicted using a black color.

As depicted, the fourth mathematical expression 516D comprises a fourth mathematical expression left side 517D, a fourth mathematical expression answer bubble 518D, and a fourth mathematical expression right side 519B. As depicted, the fourth mathematical expression left side 517D comprises the number 5. As depicted, the fourth mathematical expression left side 517D is depicted using a black color. As depicted, the fourth mathematical expression answer bubble 518D is depicted in a red color, signaling to the user 504 that the fourth mathematical expression answer bubble 518D represents an incorrect answer. As depicted, the fourth mathematical expression right side 519D comprises the number 10. As depicted, the fourth mathematical expression right side 519D is depicted using a black color.

The visual teaching section 510 further comprises a first caption 524A that is associated with the first visual teaching slide 515A. For example, the first caption 524A asks a question relating to the teaching prompt 505. As depicted, the first caption 524A comprises the question, "What number on the left?"

Similarly, the visual teaching section 510 further comprises a second caption 524B that is associated with the second visual teaching slide 515B. For example, the second caption 524B comprises an instruction relating to the teaching prompt 505. As depicted, the second caption 524B comprises the instruction, "Move the symbol where it belongs."

The learning tools page 502 further comprises a description section 526. For example, the description section 526 comprises a description of the lesson the system is teaching. For example, the description section 526 comprises one or two sentences. For example, the description section 526 comprises one or two paragraphs of text. For example, the description section 526 reinforces to the user 504 ideas addressed by the visual teaching section 510.

For example, and as depicted, the description section 526 comprises a first learning tip 530A, the first learning tip 530A configured to advise the user 504 regarding the lesson. For example, and as depicted, the description section 526 further comprises a second learning tip 530B, the second learning tip 530B configured to advise the user 504 regarding the lesson. As depicted, the first learning tip 530A comprises the words, "The symbol < means 'Less Than'." As depicted, the second learning tip 530B comprises the words, "The value on the LEFT is LESS THAN the value on the RIGHT."

The interactive visual education page 501 comprises a first task 535A that the user 504 is asked to perform to learn more about the lesson. As depicted, the learning tools page 502 further comprises the first task 535A. As depicted, the first task 535A comprises the words, "Question 1: This is a playable game where the user has to select which number is less than 50 in order to win."

The interactive visual education page 501 comprises an action prompt 540. As depicted, the interactive tools page 503 comprises the action prompt 540. The action prompt 540 is configured to prompt the user 504 to perform an action. The action prompt 540A is configured to offer the user 504 an opportunity to participate in the learning process by performing one or more of guiding the user 504 on what to do, engaging the user 504 with the lesson, and letting the user 504 express the lesson in his or her own way.

As depicted, the action prompt 540 comprises the words, "Draw a quiz using the LESS THAN symbol." As depicted, the action prompt 540 is configured to prompt the user 504 to perform the action of drawing.

The interactive visual education page 501 comprises an action region 545. As depicted, the interactive tools page 503 comprises the action region 545. The action region 545 is configured to provide the user 504 with an interactive area 545 in which the action comprised in the action prompt 540 can be executed. For example, the interactive area 545 is configured to allow the user 504 to do one or more of draw a picture and perform an action. For example, the interactive area 545 is configured to do one or more of interactively support the user 504 in applying what the user has learned and reinforce the lesson. For example, the interactive tools are configured to enable the user to play a game that will complement the lesson the system is teaching.

The interactive visual education page 501 comprises a second task 535B that the user 504 is asked to perform to learn more about the lesson. As depicted, the interactive tools page 503 further comprises the second task 535B. As depicted, the second task 535B comprises the words, "Question 2: This is a playable game where the user has to guide the green 'less than' symbol t the correct equation in order to win. Note: the red and blue circles will be gold in the game so the user cannot tell the answer by color."

Optionally, the interactive visual education page 501 further comprises a closing tip. As depicted, the interactive tools page 503 comprises the closing tip 560. The optional closing tip 560 comprises information regarding the lesson. For example, the optional closing tip 560 further comprises an action region 545. For example, the optional closing tip reinforces the lesson conveyed by the interactive visual education page 501. For example, the optional closing tip 560 reinforces the lesson conveyed by the action region 545.

As depicted, the closing tip 560 comprises the words, "Tip: Draw the correct answer in BLUE and the wrong answers in RED. BLUE and RED will automatically turn GOLD in the game!" The closing tip 560 thereby prompts the user 504 to take a picture of their drawing in the action region 545, using the external device 511, in order to play the resulting game, as outlined more fully in the patent application "CODELESS VIDEO GAME DEVELOPMENT PLATFORM," by Horstman, co-filed herewith. In playing the game, the action region 545 presents all potential answers in a gold color so as to not reveal the answer to the user 504.

Figure 6:
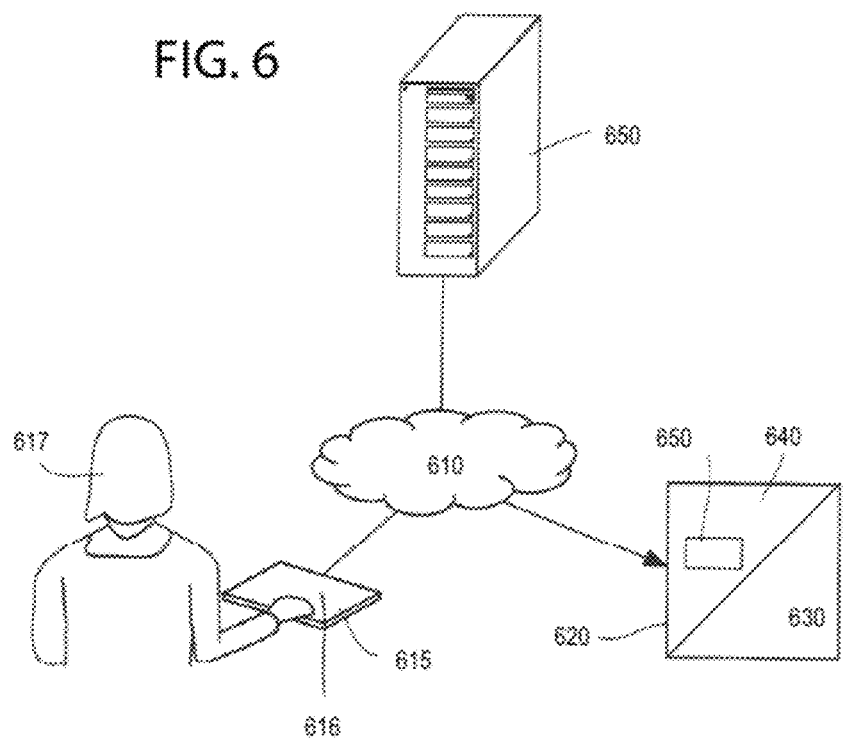
FIG. 6 and FIG. 9 are system diagrams for a system for interactive visual education.

FIG. 6 is a system diagram for a system 600 for interactive visual education. The system 600 comprises a server 605. For example, the server 605 comprises one or more of a database, a processor, a computer, a tablet, and a mobile phone. The system 600 further comprises a network 610. The network 610 is operably connected to the server 605.

The system further comprises an external device 615 comprising a screen 616, the external device usable by a user 617, the external device 615 further configured to communicate with the server 605 using the network 610. The external device 615 is configured to receive input from the user 617. For example, the external device 615 is configured to upload to the server 605 via the network 610 the input received from the user 617. For example, the external device 615 comprises one or more of a database, a processor, a computer, a tablet, and a mobile phone. Alternatively, or additionally, the external device 615 is operably connected to the server 605 via a second network (not shown). In that case, the server 605 uploads the input received from the user 617 to the server 605 via the second network (not shown)

The system further comprises an interactive visual education page 620 viewable by the user 617 using the external device 615, the interactive visual education page 620 comprising a visual teaching section 630 configured to teach the user 617 a lesson, the interactive visual education page 620 further comprising an interactive tools page 640, the interactive tools page 640 comprising an interactive tool 650 usable with the external device 615 to interactively support the user in applying the lesson The server 605 is operably connected to storage 660. For example, the server 605 is operably connected to the storage 660 via the network 610. Alternatively, or additionally, the server 605 is operably connected to the storage 660 via the second network (not shown). Alternatively, or additionally, the server 605 is operably connected to the storage 660 via a third network (not shown).

Figure 7:
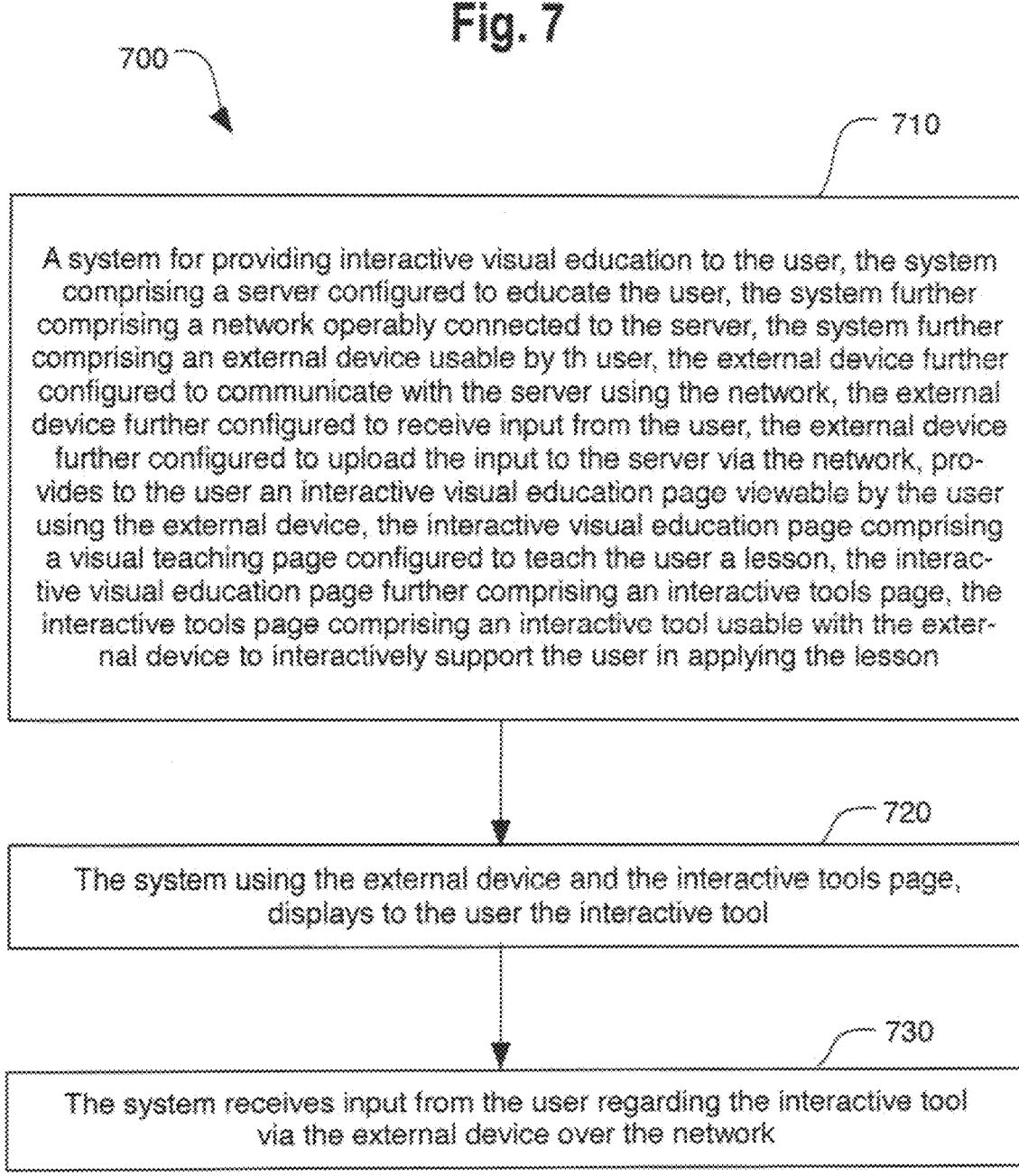
FIG. 7 is a flow chart of a method for providing interactive visual education.

FIG. 7 is a flow chart of a method 700 for providing interactive visual education to a user.

The order of the steps in the method 700 is not constrained to that shown in FIG. 7 or described in the following discussion. Several of the steps could occur in a different order without affecting the final result.

In step 710, a system for providing interactive visual education to the user, the system comprising a server configured to educate the user, the system further comprising a network operably connected to the server, the system further comprising an external device usable by the user, the external device further configured to communicate with the server using the network, the external device further configured to receive input from the user, the external device further configured to upload the input to the server via the network, provides to the user an interactive visual education page configured to interactively educate the user, the interactive visual education page viewable by the user using the external device, the interactive visual education page comprising a visual teaching section configured to teach the user a lesson, the interactive visual education page further comprising an interactive tools page, the interactive tools page comprising an interactive tool usable with the external device to interactively support the user in applying the lesson. Block 710 then transfers control to block 720.

In step 720, the system, using the external device and the interactive tools page, displays to the user the interactive tool. Block 720 then transfers control to block 730.

In step 730, the system receives input from the user regarding the interactive tool via the external device over the network. Block 730 then terminates the process.

Optionally, the method further comprises an additional step of providing to the user a closing tip using the interactive visual education page.

Advantages of embodiments of the invention include providing a top half page focusing on teaching the user, integrated with a bottom half page comprising functions selected from one or more of interactive, hands-on, and reinforcement. Further advantages of embodiments of the invention including one or more of promoting faster, more efficient learning by users and reducing teacher personpower required to teach users.

Further advantages of embodiments of the invention include that the action prompt offers the user an opportunity to participate in the learning process by performing one or more of guiding the user on what to do, engaging the user with the lesson, and letting the user express the lesson in his or her own way. Additional advantages of embodiments of the invention include that the interactive area is configured to do one or more of interactively support the user in applying what the user has learned and reinforce the lesson. An additional advantage of embodiments of the invention is that the interactive tools are configured to enable the user to play a game that will complement the lesson the system is teaching.

Still further advantages of embodiments of the invention include that in a standard but not required format, the top half page comprises a learning tools page configured to help the user learn. Still additional advantages of embodiments of the invention include that in a standard but not required format, the bottom half page comprises an interactive tools page configured to interactively support the user in applying what the user has learned. Additional advantage of embodiments of the invention include that in a standard but not required format, the bottom half page comprises a visual teaching section configured to teach the user a lesson. Still further advantages of embodiments of the invention include that in a standard but not required format, the bottom half page comprises an interactive tools page comprising an interactive tool usable with the external device to interactively support the user in applying the lesson.

Additional advantages of embodiments of the invention include focusing on one or more of interactivity and user engagement, thereby fostering one or more of deeper understanding and deeper self-learning of the lessons relative to traditional methods.

Yet further advantages of embodiments of the invention include posing the user one or more of a question or a statement to do one or more of provoke thought and encourage the user to begin to form one or more of connections and ideas using the user's own experience.

Other advantages of embodiments of the invention include the playability as games of images in the top half page, which offers the user hands-on experience in the lesson being taught. Additional advantages of embodiments of the invention include offering users an opportunity to create the user's own implementation of the lesson, fostering engagement and solidifying the process of learning the lesson being taught.

Still other advantages of embodiments of the invention include encouraging users to do one or more of think more deeply and engage in the lesson rather than simply answering questions.

For example, it will be understood by those skilled in the art that software used by the method and system for estimating accrued, equitably allocated distribution income from a security may be located in any location in which it may be accessed by the device. It will be further understood by those of skill in the art that the number of variations of the method and device are virtually limitless. It is intended, therefore, that the subject matter in the above description shall be interpreted as illustrative and shall not be interpreted in a limiting sense. For example, instead of embodiments of the invention using one or more of color and PhotoShop in processing input from the user, many other possible systems are available while remaining within the scope of the invention. For example, to process the user's input, the system can perform optical character recognition (OCR) in order to detect a meaning of one or more of words, letters, numbers, and other symbols written by the user. For example, to learn mathematics using embodiments of the invention, the user writes down mathematical equations that the system interprets using OCR. Countless other variatinos are available while remaining within the scope of the invention.

For example, instead of the top half page comprising the learning tools page, and instead of the bottom half page comprising the interactive tools, further embodiments of the invention comprise a bottom half page comprising the learning tools page, and still further embodiments of the invention comprise a top half page comprising the interactive tools. According to still other embodiments of the invention, as depicted in FIG. 9, the half page comprising the learning tools page could be a left side of a split page, and the half page comprising the interactive tools could be a right side of the split page. Moreover, an opposite configuration, with the interactive tools on the left side of the split page, and the learning tools page on the right side of the split page, is also fully consistent with the invention.

According to still other variations of the invention, some of the stated elements currently comprised in the learning tools page could instead be comprised in the interactive tools. According to yet further variations of the invention, some of the stated elements currently comprised in the interactive tools could instead be comprised in the learning tools page. According to yet other variations of the invention, hazards might comprise movable objects. Other elements could be included along with avatars, hazards, goals, movable objects, and boundaries. One or more of these elements could be deleted and still remain well within the outlined invention. The number of variations consistent with embodiments of the invention are virtually limitless.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for interactive visual education, comprising:
a server configured to educate a user;
a network operably connected to the server;
an external device usable by the user, the external device further configured to communicate with the server using the network, the external device further configured to receive input from the user, the external device further configured to upload the input to the server via the network;
an interactive visual education page configured to interactively educate the user, the interactive visual education page viewable by the user using the external device, the interactive visual education page comprising a top half page, the interactive visual education page further comprising a bottom half page, the top half page comprising a visual teaching section configured to teach the user a lesson, the bottom half page comprising an interactive tools page, the interactive tools page comprising an interactive tool usable with the external device to interactively support the user in applying the lesson; and storage configured to store data, the storage operably connected to the server over the network, wherein the interactive visual education page comprises a teaching prompt, the teaching prompt comprising a lesson that the system is teaching to the user, wherein the visual teaching section comprises a plurality of visual teaching slides configured to teach the user the lesson, wherein the visual teaching slide comprises one or more of:

an avatar icon controllable by the user to play a game;

a goal icon representing a goal the avatar icon wishes to achieve to advance in the game;

a boundary icon indicating boundaries outside of which or through which the avatar cannot go;

a hazard icon impeding the avatar from achieving the goal; and a movable object configured to affect game play, the movable object configured to be subject to translation in space by the avatar icon.

2. The system of claim 1, wherein the top half page comprises the teaching prompt.

3. The system of claim 1, wherein the teaching prompt comprises one or more of a question and a statement.

4. The system of claim 1, wherein the interactive visual education page further comprises a visual teaching section configured to teach the user the lesson.

5. The system of claim 1, wherein the visual teaching slide further comprises a caption.

6. The system of claim 5, wherein the caption comprises a possible answer to the teaching prompt that the system offers to the user.

7. The system of claim 1, wherein the interactive visual education page further comprises a description section, the description section comprising a description of the lesson.

8. The system of claim 7, wherein the description section comprises one or more of a learning tip the system offers to advise the user regarding the lesson and tasks that the system asks the user to perform to learn more about the lesson.

9. The system of claim 8, wherein the system asks that the user perform the tasks in an order specified by the order of the tasks.

10. The system of claim 8, wherein the system allows the user to perform the tasks in any desired order.

11. The system of claim 1, wherein the interactive visual education page further comprises an action prompt configured to prompt the user to perform an action relating to the lesson.

12. The system of claim 11, wherein the bottom half page comprises the action prompt.

13. The system of claim 11, wherein the interactive visual education page further comprises an action region in which the user can execute the action.

14. The system of claim 13, wherein the bottom half page comprises the action region.

15. The system of claim 13, wherein the interactive tools page further comprises a closing tip comprising information regarding the lesson.

16. The system of claim 15, wherein the bottom half page comprises the closing tip.

17. The system of claim 1, wherein the interactive tools page is configured to allow the user to do one or more of draw a picture and perform an action.

18. The system of claim 1, wherein the interactive visual education page teaches the user how to do one or more of create a game, learn a subject, and learn a skill.

19. A system for interactive visual education, comprising:

a server configured to educate a user;

a network operably connected to the server;

an external device usable by the user, the external device further configured to communicate with the server using the network, the external device further configured to receive input from the user, the external device further configured to upload the input to the server via the network;

an interactive visual education page configured to interactively educate the user, the interactive visual education page viewable by the user using the external device, the interactive visual education page comprising a top half page, the interactive visual education page further comprising a bottom half page, the top half page comprising a visual teaching section configured to teach the user a lesson, the bottom half page comprising an interactive tools page, the interactive tools page comprising an interactive tool usable with the external device to interactively support the user in applying the lesson; and storage configured to store data, the storage operably connected to the server over the network, wherein the interactive visual education page comprises a teaching prompt, the teaching prompt comprising a lesson that the system is teaching to the user, wherein the visual teaching section comprises a plurality of visual teaching slides configured to teach the user the lesson, wherein the visual teaching slide comprises one or more of:

an avatar icon controllable by the user to play a game;

a goal icon representing a goal the avatar icon wishes to achieve to advance in the game;

a boundary icon indicating boundaries outside of which or through which the avatar cannot go;

a hazard icon impeding the avatar from achieving the goal; and a movable object configured to affect game play, the movable object configured to be subject to translation in space by the avatar icon, wherein a distinct color is used to distinguish one or more of the avatar icon, the goal icon, the boundary icon, the hazard icon, and the movable object icon.

20. A system for interactive visual education, comprising:

a server configured to educate a user;

a network operably connected to the server;

an external device usable by the user, the external device further configured to communicate with the server using the network, the external device further configured to receive input from the user, the external device further configured to upload the input to the server via the network;

an interactive visual education page configured to interactively educate the user, the interactive visual education page viewable by the user using the external device, the interactive visual education page comprising a top half page, the interactive visual education page further comprising a bottom half page, the top half page comprising a visual teaching section configured to teach the user a lesson, the bottom half page comprising an interactive tools page, the interactive tools page comprising an interactive tool usable with the external device to interactively support the user in applying the lesson; and storage configured to store data, the storage operably connected to the server over the network, wherein the interactive tools page is configured to enable the user to play a game that teaches the lesson.

\* \* \* \* \*